United States Patent
Aras et al.

(10) Patent No.: US 8,966,077 B2
(45) Date of Patent: Feb. 24, 2015

(54) SYSTEMS AND METHODS FOR MULTI-TENANT GENERIC TOP LEVEL DOMAIN DEPLOYMENT

(71) Applicant: Verisign, Inc., Reston, VA (US)

(72) Inventors: Pallavi Aras, Ashburn, VA (US); Raja Chawat, Sterling, VA (US); Janardan Sapre, Centreville, VA (US); Rajesh Subramanian, Fairfax, VA (US)

(73) Assignee: Verisign, Inc., Reston, VA (US)

( * ) Notice: Subject to any disclaimer, the term of this patent is extended or adjusted under 35 U.S.C. 154(b) by 0 days.

(21) Appl. No.: 14/212,762

(22) Filed: Mar. 14, 2014

(65) Prior Publication Data

US 2014/0280849 A1    Sep. 18, 2014

Related U.S. Application Data

(60) Provisional application No. 61/791,919, filed on Mar. 15, 2013.

(51) Int. Cl.
   *G06F 15/173*    (2006.01)
   *H04L 12/24*    (2006.01)
   *H04L 29/12*    (2006.01)

(52) U.S. Cl.
   CPC .......... *H04L 41/0213* (2013.01); *H04L 61/302* (2013.01)
   USPC ............................ 709/225; 709/217; 709/245

(58) Field of Classification Search
   CPC .............. H04L 61/3015; H04L 61/302; H04L 61/3025; H04L 61/1511
   USPC .......................... 709/217, 218, 223, 225, 245
   See application file for complete search history.

(56) References Cited

U.S. PATENT DOCUMENTS

| | | | |
|---|---|---|---|
| 6,587,874 B1 | 7/2003 | Golla et al. | |
| 7,337,910 B2* | 3/2008 | Cartmell et al. | 209/245 |
| 7,797,410 B2* | 9/2010 | Westerdal | 709/223 |
| 7,805,379 B1* | 9/2010 | Adkins et al. | 705/307 |
| 7,984,170 B1 | 7/2011 | Shalla et al. | |
| 8,166,155 B1 | 4/2012 | Rachmeler et al. | |
| 8,185,608 B1 | 5/2012 | York et al. | |
| 8,423,607 B2 | 4/2013 | Saleem et al. | |
| 2002/0016174 A1* | 2/2002 | Gibson et al. | 455/464 |
| 2003/0126119 A1* | 7/2003 | Lin | 707/3 |
| 2006/0206598 A1 | 9/2006 | Borzilleri et al. | |
| 2012/0017259 A1 | 1/2012 | MacCarthaigh | |
| 2012/0102220 A1 | 4/2012 | Hopmann et al. | |
| 2012/0102481 A1 | 4/2012 | Mani et al. | |
| 2013/0124481 A1 | 5/2013 | Cahill et al. | |

OTHER PUBLICATIONS

Wallace Koehler, "An Omnibus ICANN and Internet Update", Magazine for Database Professionals, v 14, n 3, Mar. 2006, pp. 41-44.

M. Chamania et al., "A Survey of Inter-Domain Peering and Provisioning Solutions for the Next Generation Optical Networks", IEEE Communications Surveys & Tutorials, vol. 11, Issue 1, 2009, pp. 33-51.

* cited by examiner

*Primary Examiner* — Viet Vu
(74) *Attorney, Agent, or Firm* — MH2 Technology Law Group, LLP

(57) ABSTRACT

A computer implemented method of providing registry services is disclosed. The method includes identifying one or more top level domains to be serviced; creating, by a processor, a TLD group for the one or more top level domains, wherein top level domains in the TLD group share at least one characteristic; provisioning the one or more top level domains; and registering the one or more top level domains with the TLD group.

24 Claims, 7 Drawing Sheets

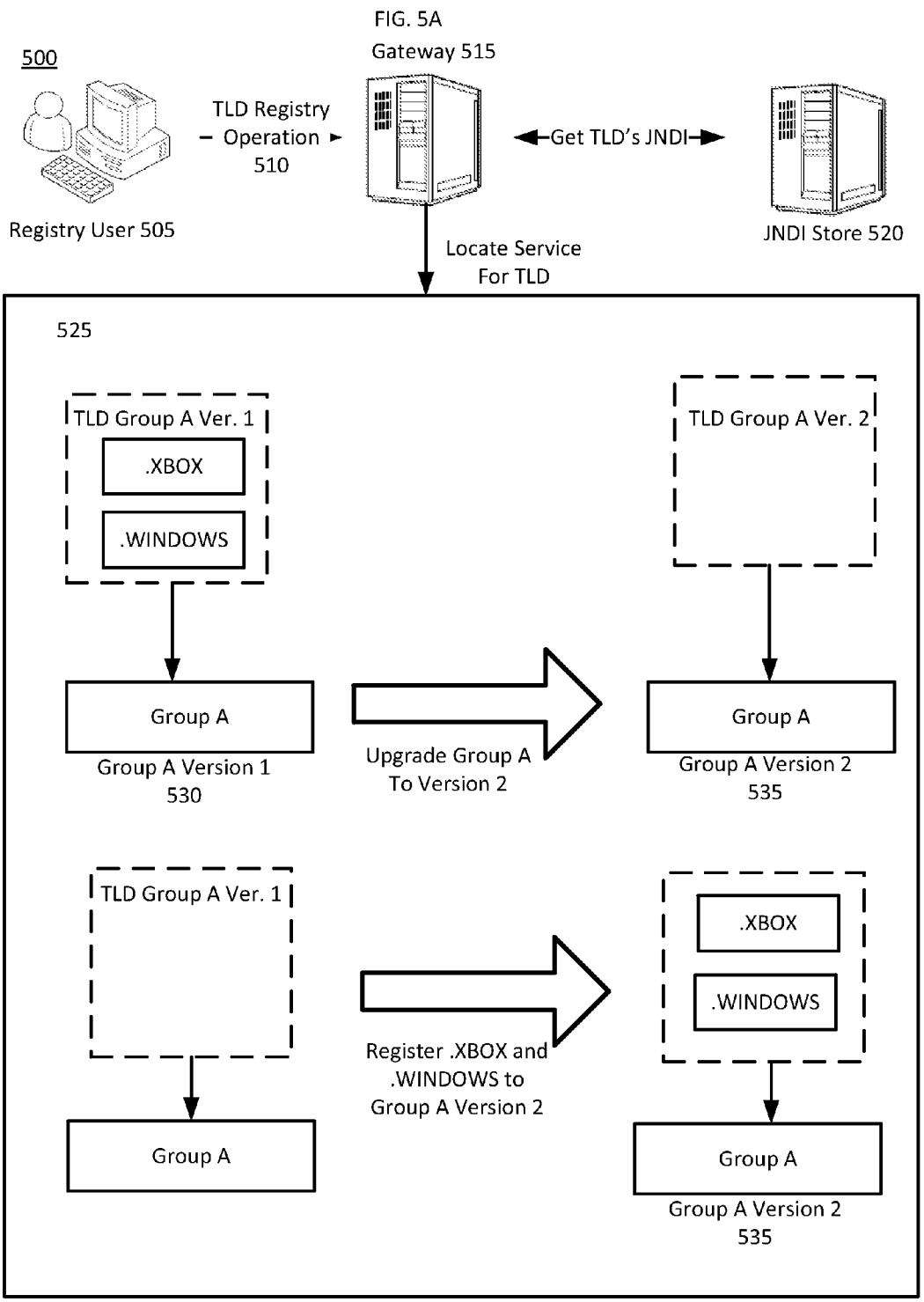

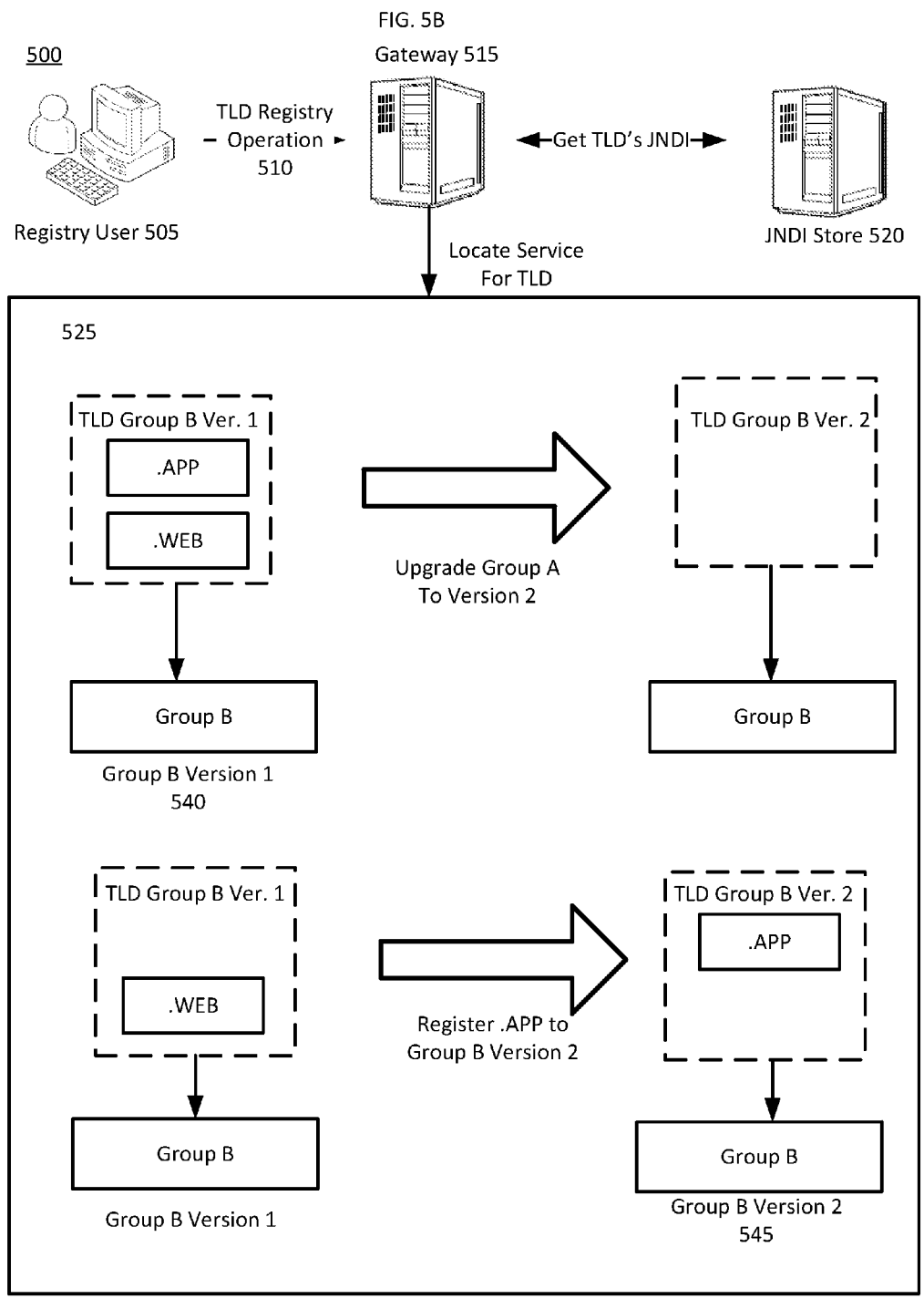

SYSTEMS AND METHODS FOR MULTI-TENANT GENERIC TOP LEVEL DOMAIN DEPLOYMENT

CROSS-REFERENCE TO RELATED APPLICATIONS

This application claims priority to U.S. Provisional Patent Application No. 61/791,919, titled "SYSTEMS AND METHODS FOR MULTI-TENANT GENERIC TOP LEVEL DOMAIN DEPLOYMENT, filed on Mar. 15, 2013, hereby incorporated by reference. This application is related to U.S. patent application Ser. No. 13/835,674 filed Mar. 15, 2013, entitled "METHOD AND SYSTEM FOR INTELLIGENT MANY-TO-MANY SERVICE ROUTING OVER EPP," pending, and assigned or under obligation of assignment to the same entity as this application and hereby expressly incorporated by reference in its entirety. U.S. patent application Ser. No. 13/835,674 filed Mar. 15, 2013 entitled "METHOD AND SYSTEM FOR INTELLIGENT MANY-TO-MANY SERVICE ROUTING OVER EPP," is a continuation-in-part of and claims priority to U.S. patent application Ser. No. 13/681,330, filed Nov. 19, 2012, entitled "Method and System for Intelligent Routing of Requests over EPP," pending, and assigned or under obligation of assignment to the same entity as this application and hereby expressly incorporated by reference in its entirety. U.S. patent application Ser. No. 13/681,330 is a continuation of and claims priority to U.S. patent application Ser. No. 12/543,462, filed Aug. 18, 2009, issued Dec. 4, 2012 as U.S. Pat. No. 8,327,019, and also assigned or under obligation of assignment to the same entity as this application and hereby expressly incorporated by reference in its entirety.

BACKGROUND

As Internet usage grows exponentially, the demand for Internet-related services is also growing rapidly. As a result of the increased usage of the Internet, the demand for domain names is also growing rapidly. Consequently, demand for domain related services is also on the rise. Such domain related services can include domain name creation, domain name registration renewal, and the like. Typically, a website serves as a primary vehicle for establishing an online presence for a domain name. To meet this ever increasing demand for domain name related services, it is necessary that the entities that provide these services do so in an efficient and cost-effective manner.

The Domain Name System ("DNS") is the part of the Internet infrastructure that translates human-readable domain names into the Internet Protocol ("IP") numbers needed to establish TCP/IP communication over the Internet. DNS allows users to refer to web sites, and other resources, using easier to remember domain names, such as "www.example.com", rather than the numeric IP addresses associated with a website, e.g., 123.4.56.78, and assigned to computers on the Internet. Each domain name can be made up of a series of character strings (e.g., labels) separated by dots. The right-most label in a domain name is known as the top-level domain ("TLD"). Examples of well-known TLDs are "com"; "net"; "org"; and the like. Each TLD supports second-level domains, listed immediately to the left of the TLD, e.g., the "example" level in "www.example.com". Each second-level domain can include a number of third-level domains located immediately to the left of the second-level domain, e.g. the "www" level in www.example.com.

The responsibility for operating each TLD, including maintaining a registry of the second-level domains within the TLD, is delegated to a particular organization, known as a domain name registry ("registry"). The registry is primarily responsible for answering queries for IP addresses associated with domains ("resolving"), typically through DNS servers that maintain such information in large databases, and operating its top-level domain.

For most TLDs, in order to obtain a domain name, that domain name has to be registered with a registry through a domain name registrar, an entity authorized to register Internet domain names on behalf end-users. Alternatively, an end-user can register a domain name indirectly through one or more layers of resellers. A registry may receive registrations from hundreds of registrars.

A registrar usually has a dedicated service connection with the registries in order to access domain related services, e.g., domain name creation or renewal. Registrars typically use the Extensible Provisioning Protocol ("EPP") as a vehicle to communicate with the registries in order to register or renew domain names. EPP is a protocol designed for allocating objects within registries over the Internet. The EPP protocol is based on Extensible Markup Language ("XML"), which is a structured, text-based format. The underlying network transport is not fixed, although the currently specified method is over Transmission Control Protocol ("TCP").

Today, a registry operating a generic top-level domain ("gTLD") must typically implement a number of requirements specified by the Internet Corporation for Assigned Names and Numbers ("ICANN'), including Domain Name Security System Extension ("DNSSEC"), Internationalized Domain Name "IDN", THIRDLEVEL domain names, ESCROW & THICK registration data. DNSSEC implementation includes complying with Requests for Comments ("RFCs") including, but not limited to:

RFC 4033—DNS Security Introduction and Requirements
RFC 4034—Resource Records for the DNS Security Extensions;
RFC 4035—Protocol Modifications for the DNS Security Extension;
RFC 5910—Domain Name System (DNS) Security Extensions Mapping for the Extensible Provisioning Protocol (EPP);
RFC 4509—Use of SHA-256 in DNSSEC Delegation Signer (DS) Resource Records;
RFC 4641—DNSSEC Operational Practices; and
RFC 5155—DNS Security (DNSSEC) Hashed Authenticated Denial of Existence.

To comply with these requirements, a registry system must address several issues. Implementation of DNSSEC protocols NSEC, NSEC3 Opt Out and NSEC3 No Opt Out combined with IDN, THIRDLEVEL involves complex business logic which needs high performance, precision and atomicity to create various DNS Records and publish a valid and operable zone file. The server should return correct DNSSEC-related resource records such as DNSKEY, RRSIG, and NSEC/NSEC3 for the signed zone, and accept and publish DS resource records from second-level domain administrators and support the full life cycle of Key Signing Keys ("KSK") and Zone Signing Keys ("ZSK"). The registry operators often may have to service a large number gTLDs and may have to provide back-end registry service for hundreds of gTLDs. Under "Registry Performance Specifications", ICANN encourages registry operators to do maintenance for different service at times and dates of statistically lower traffic for each service. This would lead to different upgrade cycles for each gTLD. The need of deploying and maintaining services for each gTLD burdens registry operators with the heavy cost associated with physical infrastructure and manual resources required to keep the system running. Running gTLD services for each TLD on the application server as independent application leads to very high memory footprint, which is not scalable and does not perform well and can lead to breach of the registry operator's obligations and may result in ICANN compliance actions up to and including termination of the registry agreement.

SUMMARY

In accordance with implementations consistent with the present teachings, a computer implemented method of providing registry services is disclosed. The method can include identifying one or more top level domains to be serviced; creating, by a processor, a TLD group for the one or more top level domains, wherein top level domains in the TLD group share at least one characteristic; provisioning the one or more top level domains; an registering the one or more top level domains with the TLD group.

In implementations, the at least one characteristics can include volume of traffic expected, a particular feature set, specific business requirements, ownership of the TLDs, and combination thereof.

In implementations, the method can further include receiving a request to initiate a new top level domain; provisioning the new top level domain; determining that the new top level domain has at least one characteristic associated with the TLD group; and registering the new top level domain with the TLD group.

In implementations, the method can further include determining to upgrade the TLD group; creating a new version of the TLD group; and registering the one or more top level domains with the new version of the TLD group.

In accordance with implementations consistent with the present teachings, a computer implemented method of providing registry services is disclosed. The method can include identifying a top level domain to upgrade; determining a TLD group that is associated with the top level domain, wherein top level domains in the TLD group share at least one characteristic; creating, by a processor, a new version of the TLD group that is associated with the upgrade; and registering the top level domain with the new version of the TLD group.

In implementations, the at least one characteristics can include volume of traffic expected, a particular feature set, specific business requirements, ownership of the TLDs, or combinations thereof.

In implementations, the method can further include identifying an additional top level domain to upgrade; determining that the TLD group is associated with the top level domain; and registering the additional top level domain with the new version of the TLD group.

In accordance with implementations consistent with the present teachings, a computer readable storage medium comprising instructions for causing one or more processors to perform a method is disclosed. The method can include identifying one or more top level domains to be serviced; creating a TLD group for the one or more top level domains, wherein top level domains in the TLD group share at least one characteristic; provisioning the one or more top level domains; and registering the one or more top level domains with the TLD group.

In implementations, the at least one characteristics can include volume of traffic expected, a particular feature set, specific business requirements, ownership of the TLDs, and combination thereof.

In implementations, the method can further include receiving a request to initiate a new top level domain; provisioning the new top level domain; determining that the new top level domain has at least one characteristic associated with the TLD group; and registering the new top level domain with the TLD group.

In implementations, the method can further include determining to upgrade the TLD group; creating a new version of the TLD group; and registering the one or more top level domains with the new version of the TLD group.

In accordance with implementations consistent with the present teachings, a computer readable storage medium comprising instructions for causing one or more processors to perform a method is disclosed. The method can include identifying a top level domain to upgrade; determining a TLD group that is associated with the top level domain, wherein top level domains in the TLD group share at least one characteristic; creating a new version of the TLD group that is associated with the upgrade; and registering the top level domain with the new version of the TLD group.

In implementations, the at least one characteristics can include volume of traffic expected, a particular feature set, specific business requirements, ownership of the TLDs, or combinations thereof.

In implementations, the method can further include identifying an additional top level domain to upgrade; determining that the TLD group is associated with the top level domain; and registering the additional top level domain with the new version of the TLD group.

In accordance with implementations consistent with the present teachings, a system is disclosed that can include one or more memory devices storing instructions and one or more processors coupled to the one or more memory devices and configured to execute the instructions to perform a method. The method can include identifying one or more top level domains to be serviced; creating a TLD group for the one or more top level domains, wherein top level domains in the TLD group share at least one characteristic; provisioning the one or more top level domains; and registering the one or more top level domains with the TLD group.

In implementations, the at least one characteristics can include volume of traffic expected, a particular feature set, specific business requirements, ownership of the TLDs, or combinations thereof.

In implementations, the method can further include receiving a request to initiate a new top level domain; provisioning the new top level domain; determining that the new top level domain has at least one characteristic associated with the TLD group; and registering the new top level domain with the TLD group.

In implementations, the method can further include determining to upgrade the TLD group; creating a new version of the TLD group; and registering the one or more top level domains with the new version of the TLD group.

In accordance with implementations consistent with the present teachings, a system is disclosed that can include one or more memory devices storing instructions and one or more processors coupled to the one or more memory devices and configured to execute the instructions to perform a method. The method can include identifying a top level domain to upgrade; determining a TLD group that is associated with the top level domain, wherein top level domains in the TLD group share at least one characteristic; creating a new version of the TLD group that is associated with the upgrade; and registering the top level domain with the new version of the TLD group.

In implementations, the at least one characteristics can include volume of traffic expected, a particular feature set, specific business requirements, ownership of the TLDs, or combinations thereof.

In implementations, the method can further include identifying an additional top level domain to upgrade; determining that the TLD group is associated with the top level domain; and registering the additional top level domain with the new version of the TLD group.

BRIEF DESCRIPTION OF THE FIGURES

FIG. 5A illustrates an example of a process of creating a TLD Group and upgrading the TLD Group, according to various implementations.

FIG. 5B illustrates another example of a process of upgrading a TLD Group, according to various implementations.

DESCRIPTION

For simplicity and illustrative purposes, the principles of the present teachings are described by referring mainly to examples of various implementations thereof. However, one of ordinary skill in the art would readily recognize that the same principles are equally applicable to, and can be implemented in, all types of information and systems, and that any such variations do not depart from the true spirit and scope of the present teachings. Moreover, in the following detailed description, references are made to the accompanying figures, which illustrate specific examples of various implementations. Electrical, mechanical, logical and structural changes can be made to the examples of the various implementations without departing from the spirit and scope of the present teachings. The following detailed description is, therefore, not to be taken in a limiting sense and the scope of the present teachings is defined by the appended claims and their equivalents.

Reference will now be made in detail to the present embodiments, examples of which are illustrated in the accompanying drawings. Wherever possible, the same reference numbers will be used throughout the drawings to refer to the same or like parts.

Figure 1:
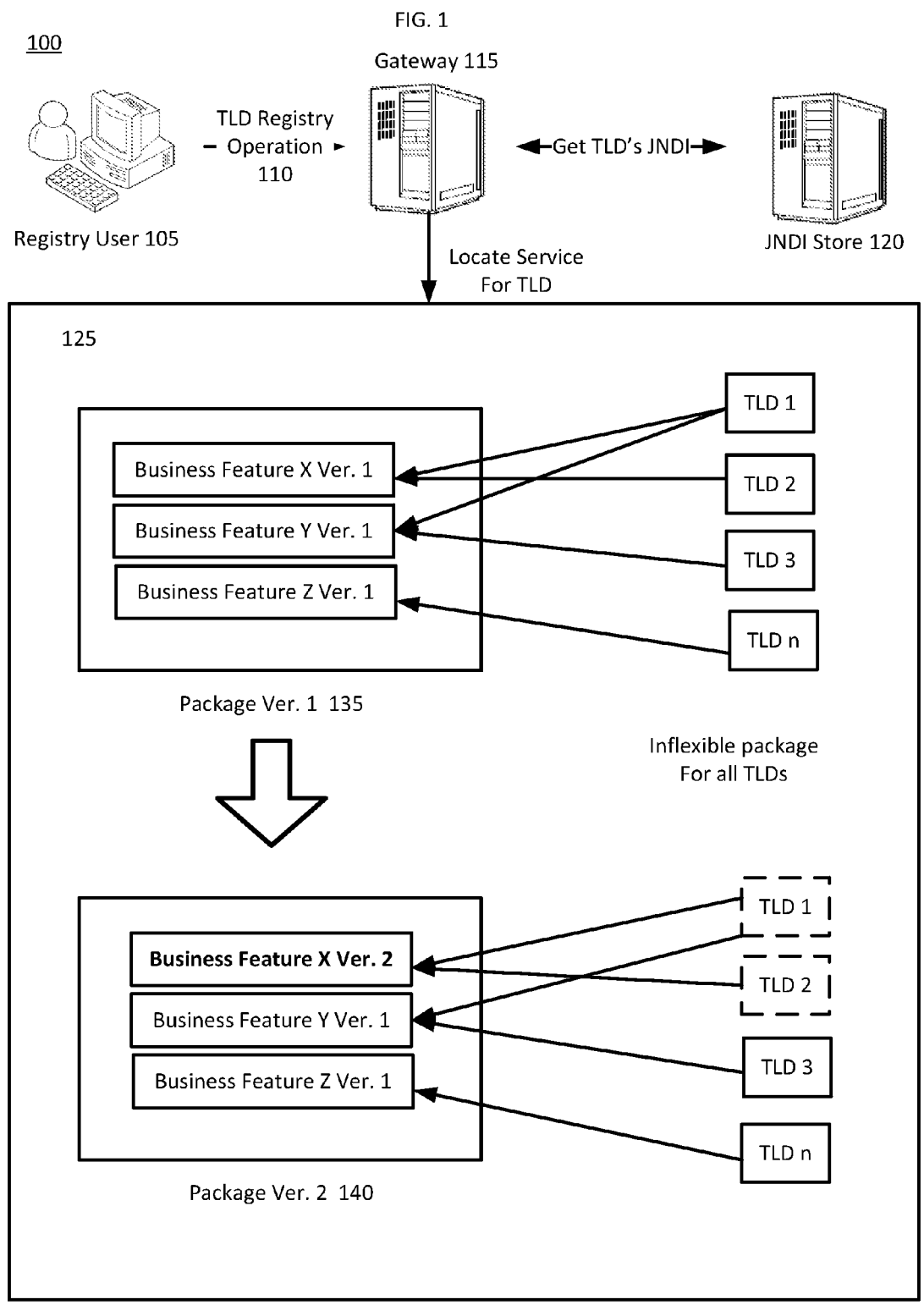
FIG. 1 illustrates a conventional TLD group upgrade scenario where all TLDs are packaged together.

FIG. 1 illustrates a conventional TLD group upgrade scenario where all TLDs are packaged together. In a typical registry system 100, when a registry user 105 sends a TLD registry operation request 110 using EPP to a gateway 115, the gateway 115 communicates with a Java Naming and Directory Interface ("JNDI") 120 to locate services for the TLD and route the request 110 to the appropriate registry service 125. A registry service 125 then processes all EPP requests. Typically the registry service 125 is packaged as a single deployment unit that handles EPP requests for all TLDs. The deployed application is responsible to execute all possible business features that a TLD may have. For example, "Business Feature X, version 1," "Business Feature Y, version 1," and "Business feature Z, version 1" are packaged together in "Package Version 1" 135. In this arrangement, TLD 1 is associated with "Business Feature X version 1" and "Business Feature Y version 1," TLD 2 is associated with "Business Feature X version 1," TLD 3 is associated with "Business Feature Y version 1," and TLD n is associated with "Business Feature Z version 1". When a business feature requires an upgrade or a new feature needs to be added to a single TLD, the whole application needs to be redeployed resulting in downtime for all applicable TLDs. For example, when "Business Feature X, version 1" is updated to "Business Feature X, version 2," "Package version 2" 140 is provisioned, which not only is impacts TLDs 1 and 2, but also the other TLDs in the updated package. This is an impractical solution if the registry service provisions a large number of TLDs with each TLD having a different upgrade cycle.

Figure 2:
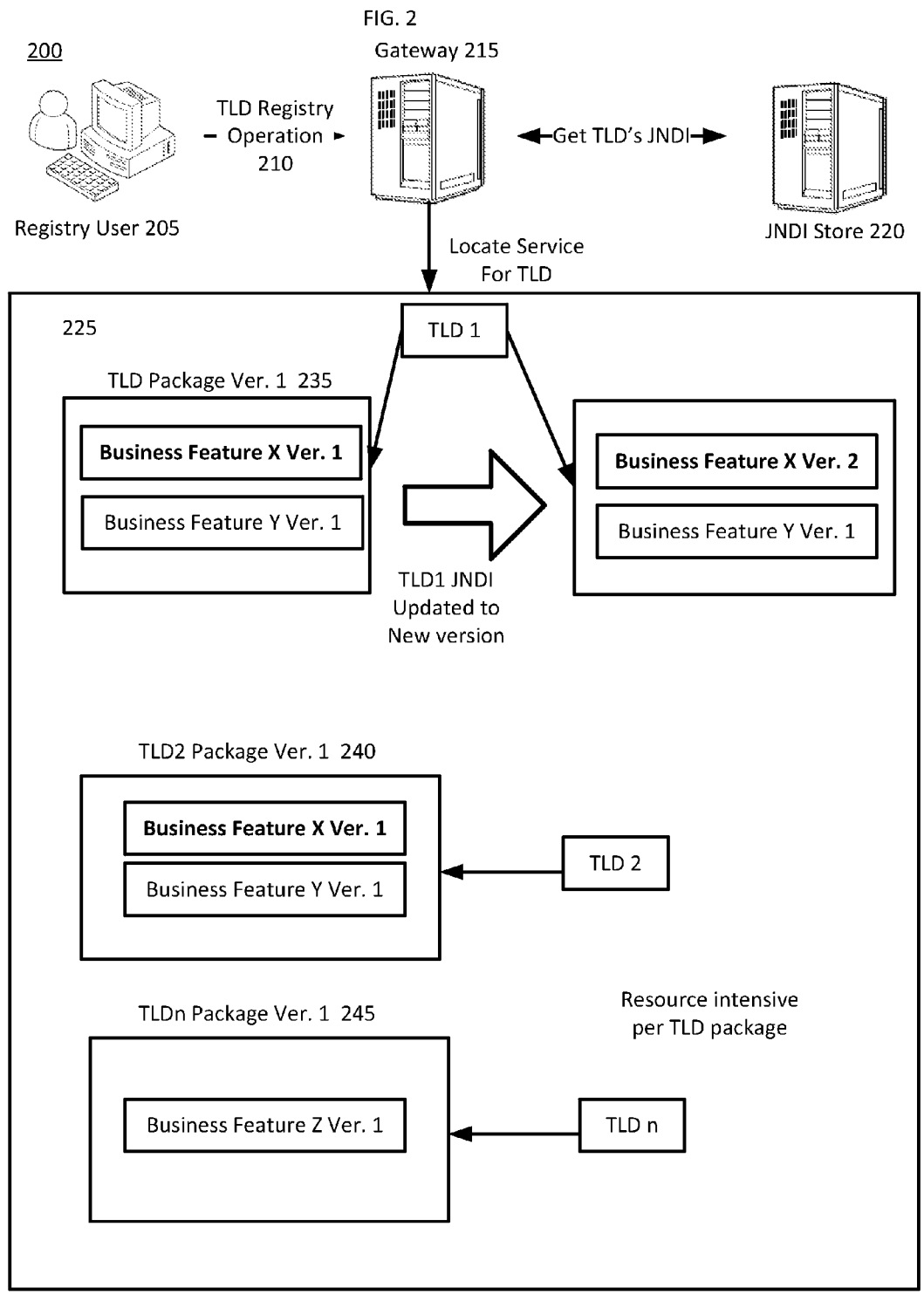
FIG. 2 illustrates an alternative solution to the previous single package model of FIG. 1 where all TLDs are packaged independently.

FIG. 2 illustrates an alternative solution to the previous single package model of FIG. 1 where all TLDs are packaged independently. This alternative solution 200 allows upgrading a TLD independent of one another. Individual TLD package deployment model gives the flexibility in terms of TLD upgrade, but this solution becomes infeasible when provisioning a huge number of TLDs. The server hosting the TLD service will become resource intensive and will not be able to scale horizontally.

As shown in FIG. 2, a registry user 205 sends a TLD registry operation request 210 using EPP to a gateway 215, where the gateway 215 communicates with a JNDI 220 to locate services for the TLD and route the request 210 to the appropriate registry 225. For example, each TLD is package separately, such that TLD1 package version 1 230 includes business feature X, version 1 and business feature Y, version 1, TLD2 package version 1 235 includes business feature X, version 1 and business feature Y version 1, and TLDn package version 1 240 includes business feature Z version 1. When business feature X is updated from version 1 to version 2 for TLD1 package, an updated package is created, which in this example is TLD1 package version 1 245. Since each TLD is packaged separately, the update to TLD1 does not impact the other TLDs.

According to implementation of the present disclosure, systems and methods address the above-discussed issues by providing a registry system that groups TLDs together and implements the TLDs as a group. The grouping of the TLDs together can be based on various considerations, including, but are not limited to, characteristic of the TLDs either the volume of traffic expected, a particular feature set or specific business requirements. Each group is responsible to handle traffic for the TLDs it holds. An upgraded version of the group can be staged separately without affecting the existing group. When the new group is ready to receive EPP requests, a single or a group TLDs can be registered to the new upgraded group.

Figure 3:
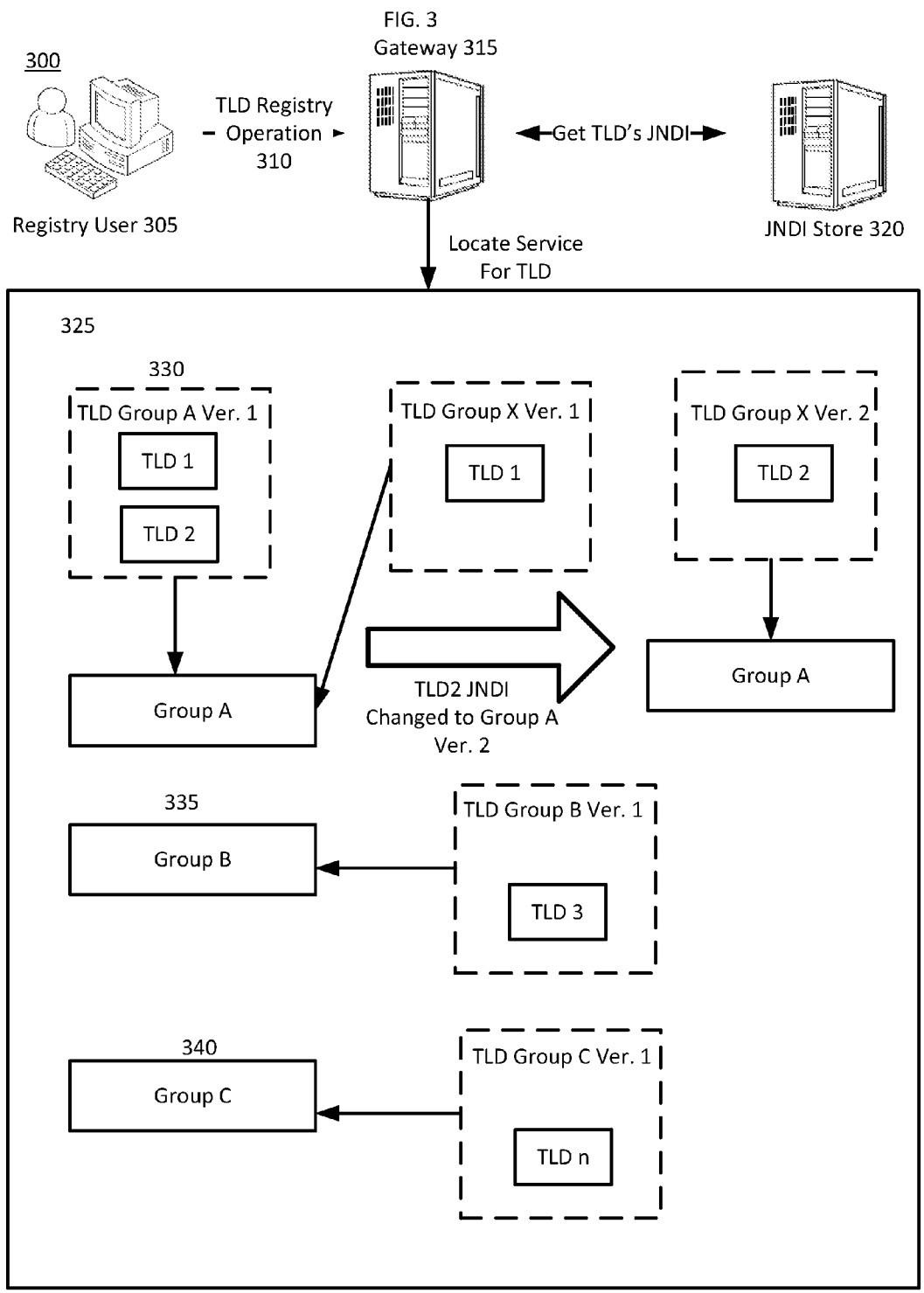
FIG. 3 illustrates an example TLD registry update operation according to implementation of the present disclosure

FIG. 3 illustrates an example TLD registry update operation according to implementation of the present disclosure. A registry user 305 sends a TLD registry operation request 310 using EPP to a gateway 315, where the gateway 315 communicates with a JNDI 320 to locate services for the TLD and route the request 310 to the appropriate registry system 325. Within registry system 325, TLD 1 and TLD 2 are grouped together within Group A version 1 330, TLD 3 is included in Group B version 1 335, and TLD n is included in Group C version 1 340. When an update to TLD 1 is requested, for example, when a business rule for TLD 1 is modified, a new Group A version 2 is created. The new Group A version 2 will then include TLD 1 with the modified business rule for TLD and unmodified TLD 2. Moreover, as indicated by the arrow, TLD 2 is upgraded from TLD Group A version 1 to TLD Group A version 2, for example, to add more features to the newer version of the group.

This approach has several advantages over both deployment and packaging strategies presented earlier. By handling TLDs as a group, the registry system 325 can provide flexible upgrade for a TLD with minimal or no downtime. The registry system 325 can provide horizontal scalability and can provide cost effectiveness in terms of maintenance and infrastructure. Additionally, the registry system 325 can add a new TLD to an existing group without affecting other TLDs.

In implementation, the registry system 325 can identify characteristics of multiple TLDs. Once identified, the registry system 325 can map the multiple TLDs to a uniquely defined TLD group. A TLD group can include one or more TLDs that share one or more characteristics that allow the TLDs to be serviced as a group efficiently. For example, the characteristics can include, but are not limited to, volume of traffic expected, a particular feature set, specific business requirements, ownership of the TLDs, or combinations thereof. Once the TLD group is created, the TLD group can be implemented in a Back-End Platform. When a request arrives for one of the TLDs in a TLD group, the requests is routed to the TLD group with which the TLD is a member.

The registry system 325 can also be configured to add a new TLD to an existing TLD Group. The registry system 325 can also be configured to update or upgrade one or more TLDs in a TLD Group. The registry system 325 can also be configured to update or upgrade a TLD Group. The registry system 325 can update or upgrade the TLD Group without affecting existing TLDs. The registry system 325 can update or upgrade TLDs to a new version of the TLD Group at a flexible schedule with minimal outage. As used herein, upgrade can refer to an update or upgrade.

Figure 4:
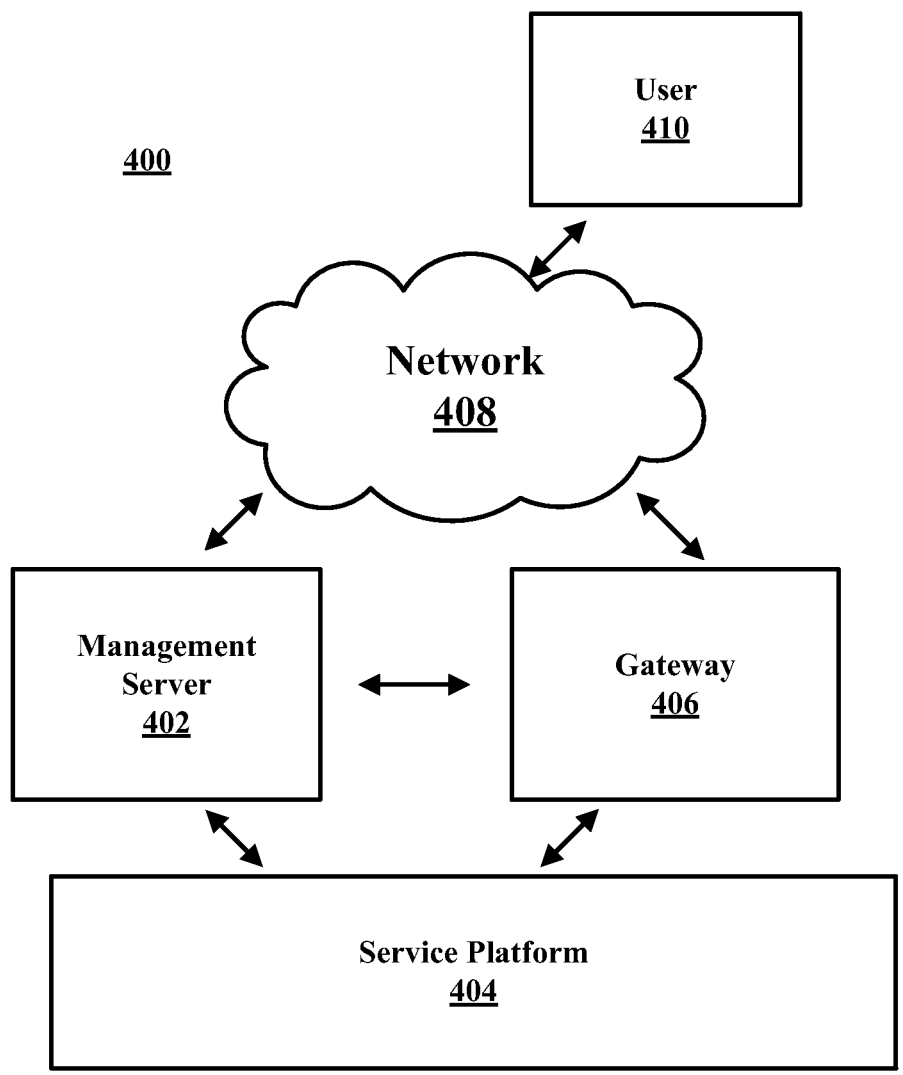
FIG. 4 illustrates an example of a registry system 400 that can create, monitor, upgrade, and update TLD Groups, according to various implementations.

FIG. 4 illustrates an example of a registry system 400 that can create, monitor, upgrade, and update TLD Groups, according to various implementations. While FIG. 4 illustrates various components contained in the registry system 300, FIG. 4 illustrates one example of a registry system and additional components can be added and existing components can be removed.

As illustrated in FIG. 4, the registry system 400 can include a management server 402, a service platform 404, and a gateway 406. The management server 402, the service platform 404, and the gateway 406 can be coupled to a network 408. The network 408 can be any type of local-area network, wide area network, and combination thereof. Additionally, a user 410 can communicate with management server 402, the service platform 404, and the gateway 406 via the network 408.

The service platform 404 can be configured to provide the services for the TLDs and TLD groups. A complete description of the service platform 404 and its functionality can be found in the related applications referenced above, which have been incorporated by reference in their entirety. In some implementations, the service platform 404 can be implemented as a CTLD Platform. The CTLD platform can provide core business services that spans across all features supported by TLD. The CTLD platform can be released as an archive and can be used by TLD Manager to create a deployable artifact that can serve one or many gTLDs. The CTLD can solve the complexity of a gTLD platform by providing generic APIs that can work across all possible combination of TLD features. CTLD platform can provide business services component to provide base TLD platform and features like DNSSEC, IDN, THIRDLEVEL, ESCROW & THICK Registration Data services. CTLD platform manages the complexity of the gTLD system.

The gateway 406 can provide a conduit for the user 410 to communicate with the service platform 404 and/or the management server 402. For example, the gateway 406 can implement EPP. A complete description of the gateway 406 and its functionality can be found in the related application referenced above.

The management server 402 can be configured to manage the service platform 404 and perform the processes as described herein. A complete description of the management server 402 and its functionality can be found in the related application referenced above.

In some implementations, the management server 402 can include a TLD manager, a namestore manager, and a product manager. While described as being part of the management server 402, these can be implemented in any of the components of the registry system 400. Likewise, one or more of the TLD manager, namestore manager, and product manager can be implemented separately.

The namestore manager can provide a way to manage TLD as a product and provides user and group authentication & authorization services. The product manager can provide mapping of TLD meta-data including the application server, TLD Group and its version. The TLD manager can manage the TLDs and TLD groups as described herein. The TLD manager can be implemented as a web application that allows CSRs to manage TLD lifecycle. The management can include creating a new TLD, updating existing TLD; mapping TLD to a TLD Group; managing TLD Group; upgrading TLD Group to latest available CTLD platform; registering TLD with the newly deployed TLD Group, and combinations thereof.

TLD Manager can provision a TLD by choosing a characteristic that the TLD may exercise and associating it to a new or existing TLD Group that would handle the service requests over EPP. This solves the concern of provisioning high volume TLDs and operation costs per TLD. TLD Manager can provision a TLD Group's deployable archive using the latest base platform and stages it for deployment. When a TLD group is deployed, it registers the TLD meta-data including group name, group version, server context with the Product Manager. TLD Manager can allow managing multiple versions of a TLD Group. TLD Manager can compare the base platform version to the version used by TLD Groups and gives upgrade option for the group. TLD Managers can allow upgrading a TLD to a newer version of the group after it is deployed. Upon upgrade, TLD Manager re-registers new TLD meta-data with the Product Manager. This solves service availability & gTLD Maintenance cycles concerns.

The namestore manager can provide a way to manage TLD as a product and provides user and group authentication & authorization services. The product manager can provide mapping of TLD meta-data including the application server, TLD Group and its version. The product manager can a central service entry point (VIP) and application service mapping component covered by the applications referenced above. The TLD Manager can use product manager to register the TLD's group information. This allows a flexible upgrade cycle with minimal or no client impact for a TLD. Use of Namestore to create a product allowing use of EPP Namestore Extension for the new TLD.

In some implementations, the service platform 404 can be implemented as a CTLD platform. The CTLD platform can provide core business services that spans across all features supported by TLD. The CTLD platform can be released as an archive and can be used by TLD Manager to create a deployable artifact that can serve one or many gTLDs. The CTLD can solve the complexity of a gTLD platform by providing generic APIs that can work across all possible combination of TLD features. CTLD platform can provide business services component to provide base TLD platform and features like DNSSEC, IDN, THIRDLEVEL, ESCROW & THICK Registration Data services. CTLD platform manages the complexity of the gTLD system.

FIG. 5A illustrates an example of a process of creating a TLD Group and upgrading the TLD Group, according to various implementations. The illustrated stages of the processes are examples and that any of the illustrated stages can be removed, additional stages can be added, and the order of the illustrated stages can be changed. Also, while FIG. 5A illustrates various components contained in the registry system, FIG. 5A illustrates one example of a registry system and additional components can be added and existing components can be removed.

As illustrate in FIG. 5A, a registry operator 505, for example, MICROSOFT, can desire to initiate the TLDs ".XBOX" and ".WINDOWS". The registry operator 505 sends a TLD registry operation request 510 using EPP to a gateway 515, where the gateway 515 communicates with a JNDI 520 to locate services for the TLD and route the request 510 to the appropriate registry system 525. The registry system 525 can identify and create a TLD for the registry operator 505. For example, the registry system 525 can provision a non-distributed brand TLD ".XBOX" for the registry. The registry system 525 can then create a TLD Group "Group A version 1" 530. In other words, the TLD group can be the first version of "Group A." The registry system 525 can then deploy "Group A version 1" to the service platform and register ".XBOX" to it. To register the ".XBOX", the registry system 525 can provide an identification of ".XBOX" in "Group A version 1" 530 to the gateway 515. At this point "Group A version 1" is ready to serve EPP requests for ".XBOX".

Then, the registry system 525 can identify an additional TLD to be initiated and create the additional TLD. For example, the registry system 525 can provision a non-distributed brand TLD ".WINDOWS" for the registry operator 505. The registry system 525 can determine that the two TLDs share a characteristic. For example, ".XBOX" and ".WINDOWS" are associated with the registry operator "MICROSOFT." The registry system 525 can determine to add the additional TLD to the existing TLD Group "Group A version 1" 530. The registry system 525 can register ".WINDOWS" to the existing TLD Group "Group A version 1" 530. "Group A version 1" 530 is ready to serve EPP requests for '.WINDOWS' without affecting '.XBOX'. Thus, the registry system 525 can provision new TLD with no downtime for existing TLDs.

At a later time, the registry system 525 can upgrade the Group TLD to use a newer based service platform. For example, the registry system 525 can upgrade "Group A version 1" 530 to "Group A version 2" 535 to use the newer base CTLD platform. The registry system 525 can create the new version of Group A and provision the "Group A version 2" 535. The registry system 525 can then register ".XBOX" and ".WINDOWS" to "Group A version 2" 535. Since both TLD's belong to the same Registry Operator 505, the tool also allows upgrading all TLD's in the same maintenance window. After "Group A version 2" 535 is registered, the registry system 535 can un-deploy 'Group A version 1' 530 when no longer needed.

FIG. 5B illustrates another example of a process of upgrading a TLD Group, according to various implementations. The illustrated stages of the processes are examples and that any of the illustrated stages can be removed, additional stages can be added, and the order of the illustrated stages can be changed. Also, while FIG. 5B illustrates various components contained in the registry system, FIG. 5B illustrates one example of a registry system and additional components can be added and existing components can be removed.

As illustrated in FIG. 5B, the registry system 525 can provision distributed TLD ".APP" and create TLD Group "Group B version 1" 540. The registry system 525 can then deploy "Group B version 1" 540 and register ".APP" with "Group B version 1" 540. At this point "Group B version 1" 540 is ready to serve EPP requests for ".APP".

Then, the registry system 525 can receive a request to initiate the TLD ".WEB". The registry system 525 can provision distributed TLD ".WEB". The registry system 525 can determine that the TLD ".WEB" shares one or more characteristics with TLD Group "Group B version 1" 540. Accordingly, the registry system 525 can determine to use existing TLD Group "Group B version 1" 540. "Group B version 1" 540 can be ready to serve EPP requests for '.WEB' without affecting '.APP'. This also allows provisioning the new TLD with no downtime for existing TLDs.

Then, the registry system 525 can determine to upgrade the service platform base that provides new features. Accordingly, the registry system 525 can upgrade "Group B version 1" 540 to create a new "Group B version 2" 545 to use the newer base. Then, the registry system 525 can register ".APP" to "Group B version 2" 545. This is minimal outage for ".APP" since "Group B version 2" 545 is already available to serve EPP requests. This allows flexible upgrade cycle with minimal impact to the TLD being upgraded and no impact to other TLDs. That is "Group B version 1" 540 is still operating to service ".WEB". ".APP" EPP requests can now be forwarded to "Group B version 2" 545. ".WEB" EPP requests continue to use 'Group B version 1' 540 without any impact.

Figure 6:
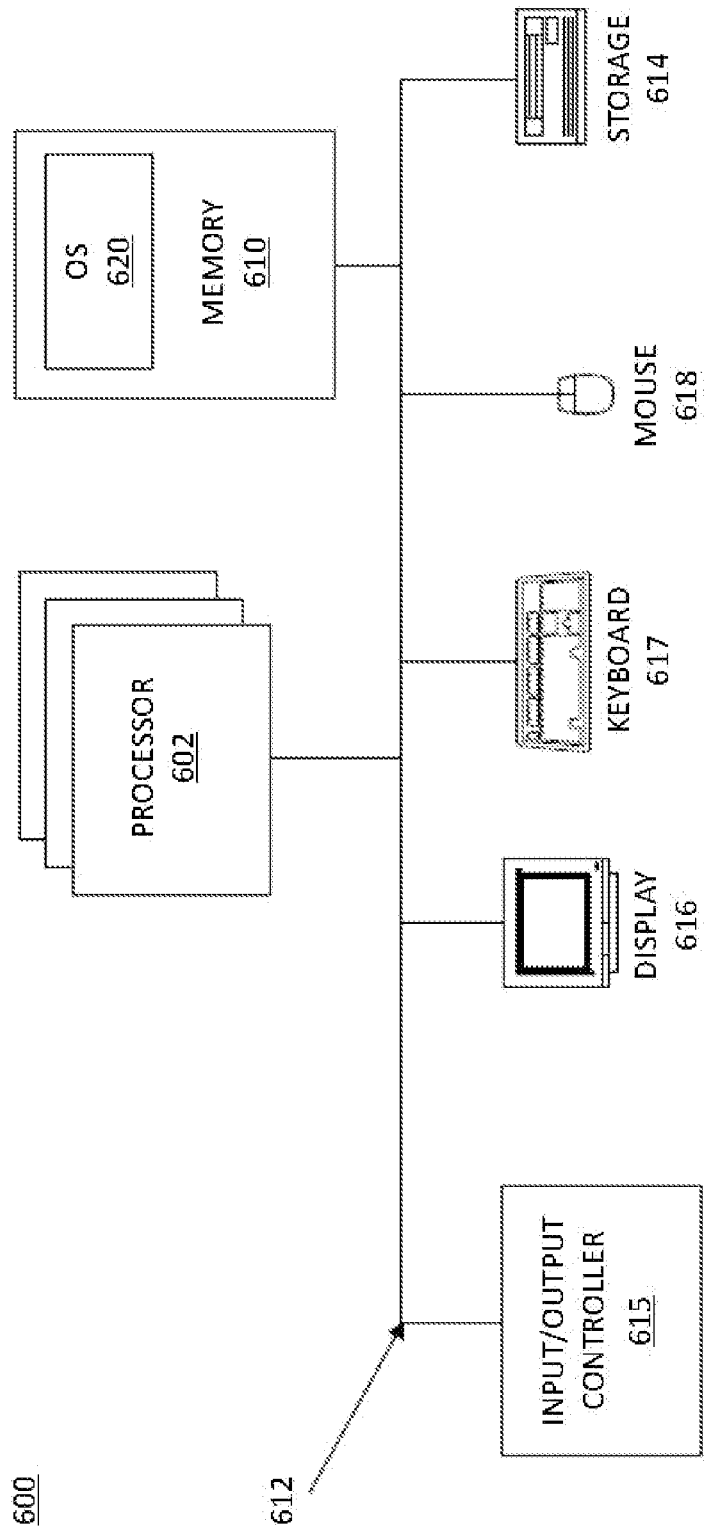
FIG. 6 illustrates a computer system 600 that is consistent with implantations of the present disclosure.

FIG. 6 illustrates a computer system 600 that is consistent with implantations of the present disclosure. In general, the components of the registry system 400 can be implemented in various computer systems, such as a personal computer, a server, a workstation, an embedded system, a multifunction device, or a combination thereof. The processes described herein can be implemented as a computer program. The computer program can exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. However, for purposes of explanation, system 600, which can be used as any of components of the registry system 400 is shown as a general purpose computer that is well known to those skilled in the art. Examples of the components that can be included in system 600 will now be described.

As shown, system 600 can include at least one processor 602, a keyboard 617, a pointing device 618 (e.g., a mouse, a touchpad, and the like), a display 616, main memory 610, an input/output controller 615, and a storage device 614. Storage device 614 can comprise, for example, RAM, ROM, flash memory, EEPROM, CD-ROM or other optical disk storage, magnetic disk storage or other magnetic storage devices, or any other medium that can be used to carry or store desired program code in the form of instructions or data structures and that can be accessed by a computer. A copy of the computer program embodiment of the printer driver can be stored on, for example, storage device 614. System 600 can also be provided with additional input/output devices, such as a printer (not shown). The various components of system 600 communicate through a system bus 612 or similar architecture. In addition, system 600 can include an operating system (OS) 620 that resides in memory 610 during operation. One skilled in the art will recognize that system 600 can include multiple processors 602. For example, system 600 can include multiple copies of the same processor. Alternatively, system 600 can include a heterogeneous mix of various types of processors. For example, system 600 can use one processor as a primary processor and other processors as co-processors. For another example, system 600 can include one or more multi-core processors and one or more single core processors. Thus, system 600 can include any number of execution cores across a set of processors (e.g., processor 602). As to keyboard 617, pointing device 618, and display 616, these components can be implemented using components that are well known to those skilled in the art. One skilled in the art will also recognize that other components and peripherals can be included in system 600.

Main memory 610 serves as a primary storage area of system 600 and holds data that is actively used by applications, such as the printer driver in the barcode printing system, running on processor 602. One skilled in the art will recognize that applications are software programs that each contains a set of computer instructions for instructing system 600 to perform a set of specific tasks during runtime, and that the term "applications" can be used interchangeably with application software, application programs, device drivers, and/or programs in accordance with embodiments of the present teachings. Memory 610 can be implemented as a random access memory or other forms of memory as described below, which are well known to those skilled in the art.

OS 620 is an integrated collection of routines and instructions that are responsible for the direct control and management of hardware in system 600 and system operations. Additionally, OS 620 provides a foundation upon which to run application software and device drivers. For example, OS 620 can perform services, such as resource allocation, scheduling, input/output control, and memory management. OS 620 can be predominantly software, but can also contain partial or complete hardware implementations and firmware. Well known examples of operating systems that are consistent with the principles of the present teachings include MICROSOFT WINDOWS (e.g., WINDOWS CE, WINDOWS NT, WINDOWS 2000, WINDOWS XP, and WINDOWS VISTA), MAC OS, LINUX, UNIX, ORACLE SOLARIS, OPEN VMS, and IBM AIX.

The foregoing description is illustrative, and variations in configuration and implementation can occur to persons skilled in the art. For instance, the various illustrative logics, logical blocks, modules, and circuits described in connection with the embodiments disclosed herein can be implemented or performed with a general purpose processor (e.g., processor 602), a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described can be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

If implemented in software, the functions can be stored on or transmitted over a computer-readable medium as one or more instructions or code. Computer-readable media includes both tangible, non-transitory computer storage media and communication media including any medium that facilitates transfer of a computer program from one place to another. A storage media can be any available tangible, non-transitory media that can be accessed by a computer. By way of example, and not limitation, such tangible, non-transitory computer-readable media can comprise RAM, ROM, flash memory, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, DVD, floppy disk and Blu-ray disc where disks usually reproduce data magnetically, while discs reproduce data optically with lasers. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Combinations of the above should also be included within the scope of computer-readable media.

Resources described as singular or integrated can in one embodiment be plural or distributed, and resources described as multiple or distributed can in embodiments be combined. The scope of the present teachings is accordingly intended to be limited only by the following claims. Although the invention has been described with respect to specific embodiments, it will be appreciated that the invention is intended to cover all modifications and equivalents within the scope of the following claims.

While the teachings have been described with reference to examples of the implementations thereof, those skilled in the art will be able to make various modifications to the described implementations without departing from the true spirit and scope. The terms and descriptions used herein are set forth by way of illustration only and are not meant as limitations. In particular, although the processes have been described by examples, the stages of the processes can be performed in a different order than illustrated or simultaneously. Furthermore, to the extent that the terms "including", "includes", "having", "has", "with", or variants thereof are used in either the detailed description and the claims, such terms are intended to be inclusive in a manner similar to the term "comprising." As used herein, the terms "one or more of" and "at least one of" with respect to a listing of items such as, for example, A and B, means A alone, B alone, or A and B. Further, unless specified otherwise, the term "set" should be interpreted as "one or more." Also, the term "couple" or "couples" is intended to mean either an indirect or direct connection. Thus, if a first device couples to a second device, that connection can be through a direct connection, or through an indirect connection via other devices, components, and connections.

What is claimed is:

1. A computer implemented method of providing registry services, the method comprising:
   identifying one or more top level domains ("TLD") to be serviced;
   creating, by a processor, a TLD group for the one or more top level domains, wherein top level domains in the TLD group share at least one characteristic;
   determining to upgrade the TLD group;
   creating a new version of the TLD group;
   provisioning the one or more top level domains; and
   registering the one or more top level domains with the new version of the TLD group.

2. The method of claim 1, wherein the at least one characteristics comprises volume of traffic expected, a particular feature set, specific business requirements, ownership of the TLDs, and combination thereof.

3. The method of claim 1, the method further comprising:
   receiving a request to initiate a new top level domain;
   provisioning the new top level domain;
   determining that the new top level domain has at least one characteristic associated with the TLD group; and
   registering the new top level domain with the TLD group.

4. A computer implemented method of providing registry services, the method comprising:
   identifying a top level domain ("TLD") to upgrade;
   determining a TLD group that is associated with the top level domain, wherein top level domains in the TLD group share at least one characteristic;
   creating, by a processor, a new version of the TLD group that is associated with the upgrade; and
   registering the top level domain with the new version of the TLD group.

5. The method of claim 4, wherein the at least one characteristics comprises volume of traffic expected, a particular feature set, specific business requirements, ownership of the TLDs, or combinations thereof.

6. The method of claim 4, the method further comprising:
   identifying an additional top level domain to upgrade;
   determining that the TLD group is associated with the top level domain; and
   registering the additional top level domain with the new version of the TLD group.

7. A computer readable storage medium comprising instructions for causing one or more processors to perform a method, the method comprising:
   identifying one or more top level domains ("TLD") to be serviced;
   creating a TLD group for the one or more top level domains, wherein top level domains in the TLD group share at least one characteristic;
   determining to upgrade the TLD group;
   creating a new version of the TLD group;
   provisioning the one or more top level domains; and
   registering the one or more top level domains with the new version of the TLD group.

8. The computer readable storage medium of claim 7, wherein the at least one characteristics comprises volume of traffic expected, a particular feature set, specific business requirements, ownership of the TLDs, and combination thereof.

9. The computer readable storage medium of claim 7, the method further comprising:
   receiving a request to initiate a new top level domain;
   provisioning the new top level domain;
   determining that the new top level domain has at least one characteristic associated with the TLD group; and
   registering the new top level domain with the TLD group.

10. A computer readable storage medium comprising instructions for causing one or more processors to perform a method, the method comprising:
    identifying a top level domain ("TLD") to upgrade;
    determining a TLD group that is associated with the top level domain, wherein top level domains in the TLD group share at least one characteristic;
    creating a new version of the TLD group that is associated with the upgrade; and
    registering the top level domain with the new version of the TLD group.

11. The computer readable storage medium of claim 10, wherein the at least one characteristics comprises volume of traffic expected, a particular feature set, specific business requirements, ownership of the TLDs, or combinations thereof.

12. The computer readable storage medium of claim 10, the method further comprising:
    identifying an additional top level domain to upgrade;
    determining that the TLD group is associated with the top level domain; and
    registering the additional top level domain with the new version of the TLD group.

13. A device for providing registry services, the device comprising:
    one or more processors; and
    a computer readable medium comprising instructions that cause the one or more processors to perform a method comprising:
    identifying one or more top level domains ("TLD") to be serviced;
    creating, by a processor, a TLD group for the one or more top level domains, wherein top level domains in the TLD group share at least one characteristic;
    determining to upgrade the TLD group;
    creating a new version of the TLD group;
    provisioning the one or more top level domains; and
    registering the one or more top level domains with the new version of the TLD group.

14. The device of claim 13, wherein the at least one characteristics comprises volume of traffic expected, a particular feature set, specific business requirements, ownership of the TLDs, and combination thereof.

15. The device of claim 13, wherein the one or more processors are further operable to execute the method further comprising:
    receiving a request to initiate a new top level domain;
    provisioning the new top level domain;
    determining that the new top level domain has at least one characteristic associated with the TLD group; and
    registering the new top level domain with the TLD group.

16. A device for providing registry services, the device comprising:
   one or more processors; and
   a computer readable medium comprising instructions that cause the one or more processors to perform a method comprising:
   identifying a top level domain ("TLD") to upgrade;
   determining a TLD group that is associated with the top level domain, wherein top level domains in the TLD group share at least one characteristic;
   creating, by a processor, a new version of the TLD group that is associated with the upgrade; and
   registering the top level domain with the new version of the TLD group.

17. The device of claim 16, wherein the at least one characteristics comprises volume of traffic expected, a particular feature set, specific business requirements, ownership of the TLDs, or combinations thereof.

18. The device of claim 16, wherein the one or more processors are further operable to execute the method further comprising:
   identifying an additional top level domain to upgrade;
   determining that the TLD group is associated with the top level domain; and
   registering the additional top level domain with the new version of the TLD group.

19. A device for providing registry services, the device comprising:
   one or more processors; and
   a computer readable medium comprising instructions that cause the one or more processors to perform a method comprising:
   identifying one or more top level domains ("TLD") to be serviced;
   creating a TLD group for the one or more top level domains, wherein top level domains in the TLD group share at least one characteristic;
   determining to upgrade the TLD group;
   creating a new version of the TLD group;
   provisioning the one or more top level domains; and
   registering the one or more top level domains with the new version of the TLD group.

20. The device of claim 19, wherein the at least one characteristics comprises volume of traffic expected, a particular feature set, specific business requirements, ownership of the TLDs, and combination thereof.

21. The device of claim 19, wherein the one or more processors are further operable to execute the method further comprising:
   receiving a request to initiate a new top level domain;
   provisioning the new top level domain;
   determining that the new top level domain has at least one characteristic associated with the TLD group; and
   registering the new top level domain with the TLD group.

22. A device for providing registry services, the device comprising:
   one or more processors; and
   a computer readable medium comprising instructions that cause the one or more processors to perform a method comprising:
   identifying a top level domain ("TLD") to upgrade;
   determining a TLD group that is associated with the top level domain, wherein top level domains in the TLD group share at least one characteristic;
   creating a new version of the TLD group that is associated with the upgrade; and
   registering the top level domain with the new version of the TLD group.

23. The device of claim 22, wherein the at least one characteristics comprises volume of traffic expected, a particular feature set, specific business requirements, ownership of the TLDs, or combinations thereof.

24. The device of claim 22, wherein the one or more processors are further operable to execute the method further comprising:
   identifying an additional top level domain to upgrade;
   determining that the TLD group is associated with the top level domain; and
   registering the additional top level domain with the new version of the TLD group.

* * * * *